United States Patent [19]

Hanaway

[11] Patent Number: 5,284,390
[45] Date of Patent: Feb. 8, 1994

[54] GUIDE POST, GUIDE SLEEVE AND MODIFIED BALL BEARING ASSEMBLY

[76] Inventor: Ronald L. Hanaway, 30210 E. Eight Mile Rd., Farmington Hills, Mich. 48236

[21] Appl. No.: 802,730

[22] Filed: Dec. 5, 1991

[51] Int. Cl.⁵ .............................................. F16C 31/04
[52] U.S. Cl. ........................................ 384/49; 384/30; 384/903
[58] Field of Search .................... 384/49, 30, 512, 903, 384/528

[56] References Cited

U.S. PATENT DOCUMENTS

| | | |
|---|---|---|
| 2,774,430 | 12/1956 | Blazek ................................ 164/118 |
| 2,846,278 | 8/1958 | Blazek . |
| 2,987,348 | 6/1961 | Blazek . |
| 3,092,425 | 6/1963 | Connor . |
| 3,357,755 | 12/1967 | Danly . |
| 3,514,166 | 5/1976 | Coley . |
| 3,752,540 | 8/1973 | Bosworth . |
| 4,648,727 | 3/1987 | O'Neil . |
| 4,664,534 | 5/1987 | Hanaway ............................... 384/49 |
| 5,051,002 | 9/1991 | Hanaway ............................... 384/49 |

*Primary Examiner*—Lenard A. Footland
*Attorney, Agent, or Firm*—Dykema Gossett

[57] ABSTRACT

A guide post has a ball bearing cage adjustably mounted thereon. An annular stop within the cage registers with an annular snap ring secured around a portion of the guide post limiting relative longitudinal movements of the cage and post, with the cage free for rotary adjustments relative to the guide post. A guide sleeve axially receives the guide post and sleeve with the cage rotatable relative to the guide post and sleeve when the cage and sleeve are separated. The guide post and sleeve are projected into and secured to the relatively movable die shoes of a die set assembly.

12 Claims, 1 Drawing Sheet

GUIDE POST, GUIDE SLEEVE AND MODIFIED BALL BEARING ASSEMBLY

FIELD OF INVENTION

The present invention relates to the combination of a guide post, a guide sleeve and a ball bearing assembly, such as used in a die set, and more particularly to an improved apparatus interconnecting guide post and ball bearing assembly which permits longitudinal adjustment relatively between the ball bearing assembly and guide post and rotative adjustment of a ball bearing assembly upon the guide post.

BACKGROUND OF THE INVENTION

In the environment employing a guide post and ball bearing assembly thereon and a guide sleeve, such as might be used in connection with a die set including upper and lower die shoes, various means have been heretofore employed for providing relative longitudinal movement of a guide post and a guide sleeve and with respect to an interposed ball bearing cage. There were longitudinal movements between the guide post and cage and efforts to permit or to assure relative rotary movement of the ball bearing cage with respect to the guide post and guide sleeve.

THE PRIOR ART

The patents listed below are illustrative of prior art efforts directed to the above-described combination and wherein there is provision for rotation of the ball bearing cage with the respect to the guide post and guide sleeve, such as used with respect to a die set.

| PATENT NO. | PATENTEE | DATE |
| --- | --- | --- |
| 2,774,430 | W. J. Blazek | December 18, 1956 |
| 2,846,278 | W. J. Blazek | August 5, 1958 |
| 2,987,348 | W. J. Blazek | June 6, 1961 |
| 3,092,425 | G. O. Conner | June 4, 1963 |
| 3,357,755 | J. C. Danly | December 12, 1967 |
| 3,514,166 | S. E. Coley | May 26, 1970 |
| 3,752,540 | Bosworth | August 14, 1973 |
| 4,648,727 | O'Neil, et. al. | March 10, 1987 |
| 4,664,534 | Hanaway | May 12, 1987 |

SUMMARY OF THE INVENTION

An important feature of the present invention is to provide an improved instruction and assembly between a guide post and a ball bearing assembly such that the ball bearing assembly is adapted for relative longitudinal movements with respect to the guide post and with respect to a guide sleeve and is further capable of rotary movements with respect to said guide post and guide sleeve.

Another feature of the present invention is to provide an improved guide post without guide slots therein together with stop means mounted upon the guide post intermediate its ends adapted for registry with a portion of the ball bearing assembly so that said stop means are adapted to limit relative longitudinal movement of the ball bearing assembly with respect to the guide post and at the same time permit or provide for rotary movements of the ball bearing cage with respect to the guide post.

As another feature the present improved guide post has provided adjacent one end thereof an annular groove within which is nested a suitable stop, such as a removable flexible snap ring, adapted for cooperative registry with an annular stop formed within a counterbore adjacent one end of the ball bearing assembly.

As another feature the guide post is projected into and depends from the upper die shoe of a die set and the guide sleeve projects into and is secured within the lower die shoe of a die set and arranged coaxially of said guide post. A ball bearing assembly is movably mounted upon the guide post for longitudinal movements thereon. The guide post and ball bearing assembly are adapted for longitudinal movements with respect to the guide sleeve. A cooperating snap ring stop is mounted upon the guide post intermediate its ends, adjacent its free end, adapted for cooperative registry with an annular stop upon the interior of the ball bearing assembly to facilitate and permit relative rotary movement of the ball bearing cage with respect to the guide post and guide sleeve when said guide post and sleeve are partly separated with respect to a preload line therebetween.

As another feature the ball bearing assembly has adjacent one end and exterior downwardly an internally converging chamfer facilitating axial entry of said cage and guide post into said guide sleeve.

As still another feature there is provided within the guide sleeve at one end an internal chamfer and upon the other end of the ball bearing cage an external inwardly directed chamfer for cooperative registry with the guide sleeve to facilitate relative longitudinal movements.

These and other features and objects will be seen from the following specification and claims in conjunction with the appended drawings.

THE DRAWINGS

It will be understood that the above drawing illustrates merely a preferred embodiment of the invention, and that other embodiments are contemplated within the scope of the claims hereafter set forth.

DETAILED DESCRIPTION OF AN EMBODIMENT OF THE INVENTION

Figure 1:
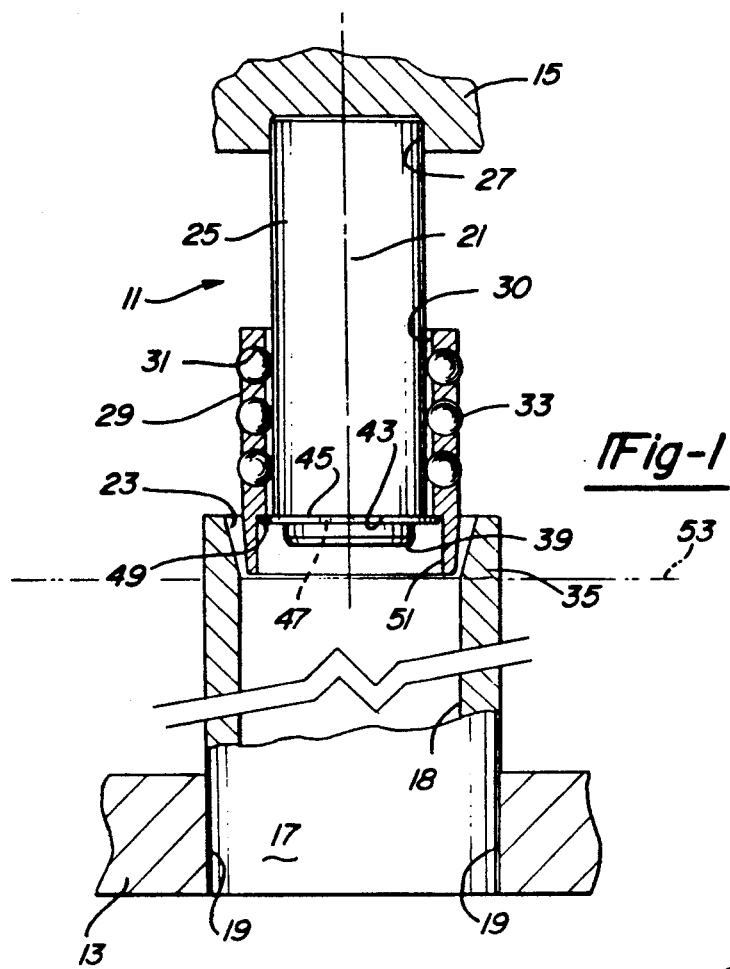
FIG. 1 is a fragmentary side elevational view of a die set including the assembled guide post, guide sleeve and ball bearing assembly.

In FIG. 1 there is disclosed a combination which includes the die set assembly 11 including lower die shoe 13 and upper die shoe 15, both fragmentarily shown.

Guide sleeve 17, normally arranged in upright position, is press fitted into bore 19 in die shoe 13 and arranged upon an upright longitudinal axis 21. One end of guide sleeve 17 has an internal annular taper 23 which is inclined downwardly and inwardly.

Axially aligned guide post 25 is further arranged upon axis 21 and at one end is press fitted or otherwise secured within the opposing bore 27 within upper die shoe 15, fragmentarily shown.

Cylindrical ball bearing cage 29, sometimes referred to as a ball retainer, has an axial bore 30, and formed therethrough a series of longitudinally spaced circles of spaced apertures 31 receiving a plurality of ball bearings 33. Said bearings project through the ball cage inwardly and outwardly thereof, respectively, and are adapted to operatively engage guide post 25 and guide sleeve 17 when the cage has moved downwardly from the position shown in FIG. 1. One end of cage 29 is chamfered or tapered downwardly and inwardly at 35 for cooperative axial registry within the internal chamfer 23 of guide sleeve 17.

When there has been such sufficient relative downward movement of guide post 25 and adjacent ball bearing cage 29, such that the respective chamfers 23 and 35 are displaced, the ball cage arrives at a preload line, schematically shown at 53. Here there is a general oversize relationship of the balls 33 with respect to bore 18 of the guide sleeve at the same time with respect to the exterior surface of the guide post of approximately 0.0001 inches.

Figure 2:
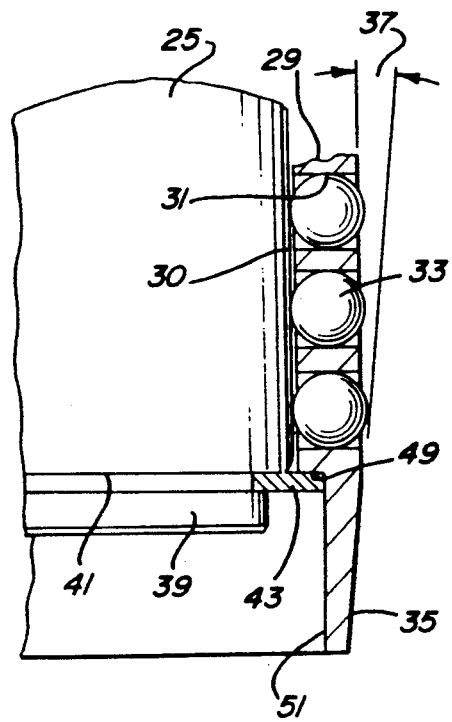
FIG. 2 is a partly sectioned fragmentary elevational view of a portion of the guide post and ball bearing assembly shown in FIG. 1, and on an increased scale.

As shown in FIG. 2 ball cage 29 includes a downwardly and inward chamfer or taper 37 at an angle of about 4½ degrees, approximately. This is for the purpose of facilitating assembly of the ball cage down into guide sleeve 17 below preload line 53.

The distal end 39 of guide post 25 is of reduced diameter relative to the diameter of said guide post. Adjacent said end there is formed within the guide post an annular groove 41 or channel within which is removably positioned the resilient retaining ring 43. This ring is sometimes referred to as a "TRUARC" trademark, of the inverted external type.

The present retaining ring 43 has a pair of laterally spaced ends 45. Extending through said ends are a pair of transverse openings 47, FIG. 1, adapted to receive a spanner type tool or the like in order to expand ring 43 sufficiently for assembly onto and within the channel 41 or removal therefrom as desired.

The snap ring or retaining ring when assembled within said groove serves as an annular stop. It is adapted for operative retaining engagement with respect to an annular stop 49 defined within the ball bearing cage 29 by counterbore 51, FIG. 1.

The cooperative relationship between snap ring 43 and annular stop 49 provides a means by which relative movement of the ball bearing cage 29 is restricted with respect to the longitudinal axis 21 of guide post 25.

Once the retaining ring 43 has been removed, the ball bearing cage 29 may be assembled onto the guide post 25 above the position shown in FIG. 1. Thereafter the snap ring 43 is assembled onto the guide post within annular groove 41. In such position said ring serves as a stop in operative engagement with the annular stop or seat 49 within the counterbore 51 of said ball cage. This provides a means by which assembly and disassembly of the ball cage is provided with respect to the guide post 25. At the same time the construction as such as to provide and permit for relative rotary movement of the ball bearing cage 29 with respect to guide post 25 and with respect to the corresponding longitudinal axis 21, and with respect to guide sleeve 17.

Relative rotary movement of the ball cage with respect to the guide post and sleeve occurs when said guide post is elevated with respect to the guide sleeve, such as about as shown in FIG. 1. This prevents tracking of the respective ball bearings over surfaces of the guide post 25 and guide sleeve 17.

Relative rotary movement of the ball cage 29 with respect to the guide sleeve and guide post may be automatic. Alternately rotation may be mechanically activated. This can be accomplished by pressurized air applied to and around the exterior surface of the ball cage. This is disclosed U.S. Pat. No. 5,141,337, dated Aug. 25, 1992, and issued to applicant.

Having described my invention reference should now be had to the following claims.

I claim:

1. In combination a guidepost having a longitudinal axis;
   a cylindrical ball bearing cage having a coaxial longitudinal bore and adjacent one end a counter bore defining an interior annular stop;
   said bores adjustably receiving said guidepost and said cage being mounted upon said guidepost for relative longitudinal and rotary movements thereon;
   said cage mounting a plurality of spaced circularly arranged ball bearings projecting inwardly and outwardly thereof respectfully for operative engagement with said guidepost;
   a resilient snap ring removably mounted upon said post inwardly of one end thereof retainingly engageable with said stop and for limiting relative longitudinal movements of said post and cage, said cage being rotatable relative to said guidepost around said axis;
   the mounting of said snap ring including an annular groove within said guidepost inwardly of one end thereof; and
   said snap ring having a pair of adjacent free ends; there being a transverse bore through each of said ends, adapted to receive a spanner type tool for expanding said snap ring for assembling said snap ring into and out from said groove.

2. In combination, a guidepost having a longitudinal axis;
   a cylindrical ball bearing cage having a coaxial longitudinal bore and adjacent one end a counter bore defining an interior annular stop;
   said bores adjustably receiving said guidepost and said cage being mounted upon said guidepost for relative longitudinal and rotary movement thereon;
   said cage mounting a plurality of spaced circularly arranged ball bearings projecting inwardly and outwardly thereof respectively for operative engagement with said guidepost;
   a resilient snap ring removably mounted upon said post inwardly of one end thereof retainingly engageable with said stop and for limiting relative longitudinal movements of said post and cage, said cage being rotatable relative to said guidepost around said axis;
   a guide sleeve coaxial to said post and cage, with said cage and guidepost projected into said sleeve for relative longitudinal movements and for rotary movements of said cage relative to said sleeve when they are separated, exterior portions of said cage being chamfered downwardly and inwardly about 4.5° relative to said axis to facilitate movements of said guidepost and cage relative to said sleeve.

3. In combination, a guide post having a longitudinal axis;
   a cylindrical ball bearing cage having a coaxial longitudinal bore and adjacent one end a counterbore defining an interior annular stop;
   said bores adjustably receiving said guide post and said cage being mounted upon said guide post for relative longitudinal and rotary movements thereon;
   said cage mounting a plurality of spaced circularly arranged ball bearings projecting inwardly and outwardly thereof respectively for operative engagement with said guide post; and a resilient snap ring removably mounted upon said post inwardly of one end thereof retainingly engagable with said stop and for limiting relative longitudinal movements of said post and cage, said cage being rotatable relative to said guide post around said axis, the mounting of said snap ring including an annular groove within said guide post inwardly of one end thereof, said guide post having a distal end portion of reduced diameter adjacent said groove, to facilitate assembly of said snap ring onto said guide post.

4. In the combination of claim 3, further comprising a guide sleeve coaxial to said post and cage, with said cage and guide post projected into said sleeve for relative longitudinal movements and for rotary movements of said cage relative to said sleeve when they are separated.

5. In the combination of claim 4, further comprising said guide post and sleeve being upright and at their ends projected into and respectively secured within the upper and lower relatively movable die shoes of a die set assembly.

6. In the combination of claim 4, further comprising said cage at said one end having an exterior downwardly and inwardly converging chamfer for facilitating axial entry of said cage and guide post into said guide sleeve.

7. In the combination of claim 6, further comprising said guide sleeve having an internal inwardly converging chamfer to guidably receive the chamfered end of said cage.

8. In the combination of claim 3, further comprising said snap ring having a pair of adjacent free ends;

there being a traverse bore through each of said ends, adapted to receive a spanner type tool for expanding said snap ring for assembling said snap ring into and out from said groove.

9. In combination, a guide post having a longitudinal axis;

a cylindrical ball bearing cage having a coaxial longitudinal bore and adjacent one end of counterbore defining an interior annular stop;

said bores adjustably receiving said guide post and said cage being mounted upon said guide post for relative longitudinal and rotary movements thereon;

said cage mounting a plurality of spaced circularly arranged ball bearings projecting inwardly and outwardly thereof respectively for operative engagement with said guide post; and a resilient snap ring removably mounted upon said post inwardly of one end thereof retainingly engagable with said stop and for limiting relative longitudinal movements of said post and cage, said cage being rotatable relative to said guide post around said axis;

a guide sleeve coaxial to said post and cage, with said cage and guide post projected into said sleeve for relative longitudinal movements and for rotary movements of said cage relative to said sleeve when they are separated;

said cage at said one end having an exterior downwardly and inwardly converging chamfer for facilitating axial entry of said cage and guide post into said guide sleeve said guide sleeve having an internal inwardly converging chamfer to guidably receive the chamfered end of said cage.

10. In the combination of claim 9, further comprising said guide post and sleeve being upright and at their ends projected into and respectively secured within the upper and lower relatively movable die shoes of a die set assembly.

11. In the combination of claim 9, further comprising the maximum diameter of said cage on engagement with the minimum diameter of said guide sleeve and with said guide post longitudinally positioned within said cage defining a preload line between said ball bearings, guide post and guide sleeve, said cage being rotatable relative to said guide sleeve and guide post when contacting portions of said ball bearings are spaced from said preload line.

12. In the combination of claim 9, further comprising exterior portions of said cage being chamfered downwardly and inwardly about 4.5 degrees relative to said axis to facilitate movements of said guide post and cage relative to said sleeve.

* * * * *